J. W. MEAKER.

Assignor, by mesne assignments, to himself, H. B. MERRELL & T. FERGUSON.

Apparatus for Holding and Delivering Coin.

No. 8,274. Reissued June 4, 1878.

*Witnesses.*

Harry King

H. M. Stansbury

*Inventor.*

J. W. Meaker by Stansbury & Munn his Attys.

UNITED STATES PATENT OFFICE.

JOHN W. MEAKER, OF CHICAGO, ILL., ASSIGNOR, BY MESNE ASSIGNMENTS, TO HIMSELF, HENRY B. MERRELL, AND THOMAS FERGUSON.

IMPROVEMENT IN APPARATUS FOR HOLDING AND DELIVERING COINS.

Specification forming part of Letters Patent No. 73,911, dated January 28, 1868; Reissue No. 8,274, dated June 4, 1878; application filed May 14, 1878.

*To all whom it may concern:*

Be it known that I, JOHN W. MEAKER, of the city of Chicago, in the county of Cook and State of Illinois, have invented certain new and useful Improvements in Apparatus for Counting and Holding Money, Coins, &c.; and I do hereby declare that the following is a full, clear, and exact description thereof, that will enable others skilled in the art to which it appertains to make and use the same, reference being had to the accompanying drawings, and to the letters of reference marked thereon, which form a part of this specification.

My invention consists in a novel device for assorting, holding, and registering coin, to be used in business transactions, in banks, and wherever money is received and paid out; and also in a device for holding currency, to be used in connection with the coin apparatus when desired.

Figure 1:
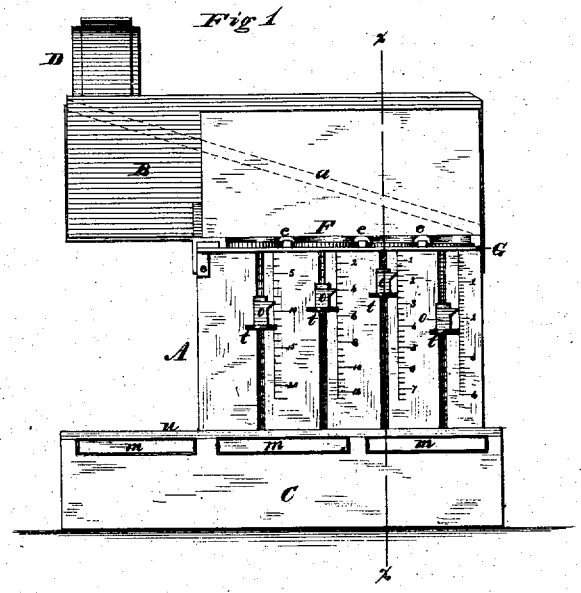
Figure 2:
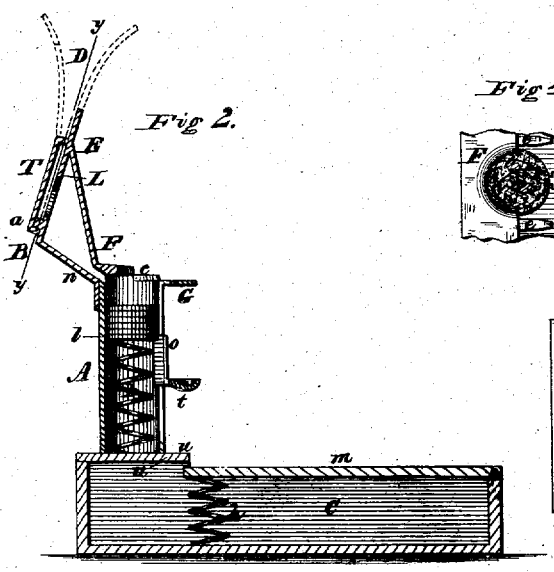
Figure 4:
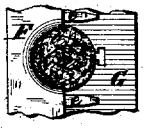
Figure 3:
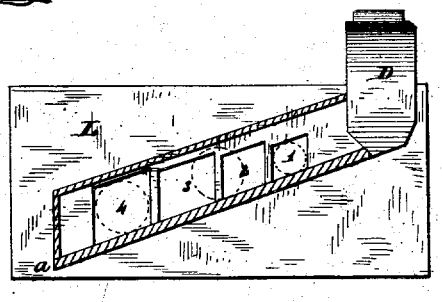

Figure 1 is a front elevation. Fig. 2 is a vertical section taken on the line *x x* of Fig. 1. Fig. 3 is a rear view of the assorter, with a portion removed to show the interior; and Fig. 4 is a top-plan view of the portion of the plate above one of the tubes.

In constructing my apparatus I provide a body, A, in which is formed a series of vertical tubes, of a diameter internally corresponding with the coins of the various denominations to be used. In these tubes is placed a sliding plate or follower, *l*, supported by a spring, *b*, and having attached to it at its front a thumb-piece, *t*, with an index or pointer, *o*, these latter being connected to the follower *l* by projecting through a vertical slot in the front of the tubes, as shown in Figs. 1 and 2. Upon the front of the tubes, and flush with their upper ends, is secured a small shelf or plate, G, and between each of the tubes, above their upper ends, is secured a small division-piece, *e*, of a thickness corresponding with that of the various coins, as shown in the same figure; and upon these is secured a plate, F, having circular recesses cut in its front edge, slightly less in diameter than the tubes, so that when the coin is raised by the spring and follower to the top of the tubes the edge of the circular recesses in the plate F will slightly project over the coin in each tube and prevent it from being raised up out of the same, as shown in Fig. 4. Upon the front of each tube is marked a series of points or graduations corresponding with the thickness of the coins, so as to indicate the number that each tube will hold, and these graduations are divided into series or groups, numbered by figures, arranged decimally or otherwise, as may be desired, the index or pointer *o* always indicating at a glance the exact number contained in any tube, the index being caused by spring *b* to rise as the coins are removed, as hereinafter explained.

The coins may be inserted singly by depressing the follower and shoving them in sidewise at the top and letting them fall down until the tube is filled; but to facilitate the operation of filling them, I provide an apparatus which I term an "assorter," and by which the various coins, when placed into one common hopper, will be automatically assorted and delivered separately to their proper tubes. This device is represented by B in the drawings, and consists of a box having its front standing nearly vertical with its bottom, and rear side slightly inclined, as shown in Fig. 2. In the interior of this box is a division-plate, L, between the rear side of which and the back plate T is secured a strip, *a*, slightly thicker than the coin, this strip *a* being inclined downward from the hopper D toward the opposite end, thus forming an inclined way, upon which the coin rolls gradually down toward its lower end, as shown clearly in Fig. 3.

In the division-plate L is cut a series of holes corresponding in size to the various-sized coins, the smallest hole being located next to the hopper or upper end, the holes increasing in size successively, in regular order, to the lower end. At the upper end of the inclined way is located a hopper or mouth, D, of proper size to permit the coin to slide in edgewise; and on the rear of the box B is secured a plate, T, which prevents the coin from falling over, and keeps it leaning against the rear side of the plate L.

Now, when coins are placed in the hopper they will slide down onto the inclined strip *a*, upon which they roll on their edge until they arrive opposite a hole in the plate L, of sufficient size to permit the coin to drop through, when it will fall upon the inclined bottom *n*, from whence it will slide under the plate F into the tube below. When a coin is started down the inclined way *a*, if it be a small one, it will drop through the first hole; but, if too large for that, it will pass on until it arrives opposite a hole that is large enough to let it fall through, and thus each coin is delivered at the proper point to enter its proper tube, there being division-plates to prevent the coins from becoming mixed after they enter the box through the holes in plate L, which division-plates serve to guide the coins to their proper tubes.

The coins, being thus assorted and placed in the separate tubes, can be used as desired by simply placing the finger on the upper one in any one or more of the tubes and drawing them forward onto the shelf G, the springs *b* instantly shoving others up into their places, ready to be drawn off in like manner.

For convenience, when paper money is to be used, I mount the coin apparatus on a box, C, having a series of lids, *m*, pivoted at one end, their opposite end being pressed up against an overlapping piece, *u*, so that by depressing the loose end of the lid *m* the end of paper bills may be inserted between it and the overlapping piece *u*, and thus be held securely in place. When wanted for use, the top one of the pile may be readily drawn out by taking hold of its loose end and giving it a sudden pull. Of course there will be as many of these lids as there are different denominations of bills to be used. Where paper money is not used, this part of the apparatus may be omitted and the coin device used alone.

My improved device may be made of any desired size, and is equally well adapted for coins of all kinds and denominations, whether gold, silver, or copper. It is especially adapted to the wants of banks and similar institutions, but may also be used in stores and railway and other offices, where money is to be paid out or change required to be made. By making a record of the amount in it at the beginning of the day's operations, and again at the close thereof, which amount can be determined by a glance at the indexes or registers, the amount paid out during the day can be readily ascertained with absolute certainty. By having two of the holding and registering devices, and arranging the assorter so that it can be shifted from one to the other, one may be used to receive the coin paid in and the other to pay from, and thus the two together will accurately register and indicate the receipts and payments during the day, the two being used alternately to receive and pay from.

By the use of my improvements much saving of both time and labor is effected, and the business more accurately as well as more speedily accomplished.

Having thus described my invention, what I claim is—

1. An apparatus for assorting, holding, and registering coins, consisting of a series of tubes of varying diameter to suit different-sized coins, and provided with indexes to show the number contained in each, and of an inclined plane or way arranged along the upper rear sides of said tubes, with openings opposite the upper ends of the same corresponding in size with the coin and the tubes, said openings being arranged with the smallest at the upper end of the incline and increasing in size toward the lower end, with partitions or guides to direct the coins to their respective tubes or receptacles, substantially as shown and described.

2. A coin-assorter consisting of an inclined plane or way for the coin to pass down, with openings corresponding in size with the various-sized coins, said openings being arranged with the smallest at the upper end of the inclined way and increasing in size, in regular order, toward the lower end, with partitions or guides to direct the various coins to their respective receptacles, substantially as described.

3. The yielding bed *m*, pivoted at one end, in combination with the stationary support *a*, arranged as and for the purpose set forth.

In testimony that I claim the foregoing I have hereunto set my hand this 24th day of April, 1878.

JOHN W. MEAKER.

Winesses:
O. A. SMITH,
CHAS. C. BLAYNEY.